(12) United States Patent
Johnson et al.

(10) Patent No.: US 6,516,106 B2
(45) Date of Patent: Feb. 4, 2003

(54) SUBTRACTING ANALOG NOISE FROM AN OPTICAL COMMUNICATION CHANNEL USING STABLE, NON-ABSORBING OPTICAL HARD LIMITERS

(75) Inventors: Erik V. Johnson, Toronto (CA); Edward H. Sargent, Toronto (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/933,338

(22) Filed: Aug. 20, 2001

(65) Prior Publication Data

US 2002/0141683 A1 Oct. 3, 2002

Related U.S. Application Data

(60) Provisional application No. 60/267,879, filed on Feb. 9, 2001.

(51) Int. Cl.[7] .................................................. G02B 6/26
(52) U.S. Cl. .............................. 385/15; 385/24; 385/42
(58) Field of Search .............................. 385/15, 24, 27, 385/42

(56) References Cited

U.S. PATENT DOCUMENTS

| | | | |
|---|---|---|---|
| 4,128,300 A | 12/1978 | Stotts et al. ............. 350/96.14 |
| 4,262,992 A | 4/1981 | Berthold, III ............ 350/96.14 |
| 4,573,767 A | 3/1986 | Jewell ....................... 350/354 |
| 4,764,889 A | 8/1988 | Hinton et al. ............. 364/807 |
| 4,864,536 A | 9/1989 | Lindmayer ................ 365/119 |
| 4,894,818 A | 1/1990 | Fujioka et al. .............. 370/3 |
| 4,930,873 A | 6/1990 | Hunter ...................... 350/354 |
| 4,932,739 A | 6/1990 | Islam ...................... 350/96.15 |
| 4,962,987 A | 10/1990 | Doran ..................... 350/96.15 |
| 4,992,654 A | 2/1991 | Crossland et al. ......... 250/213 |
| 5,078,464 A | 1/1992 | Islam ........................ 385/122 |
| 5,144,375 A | 9/1992 | Gabriel et al. ............. 356/345 |
| RE34,520 E * | 1/1994 | Adams et al. .............. 385/130 |
| 5,315,422 A | 5/1994 | Utaka et al. ............... 359/107 |
| 5,349,593 A | 9/1994 | Lomashevitch et al. ...... 372/50 |
| 5,455,703 A * | 10/1995 | Duncan et al. ............. 359/152 |
| 5,461,507 A | 10/1995 | Westland et al. .......... 359/289 |
| 5,479,384 A | 12/1995 | Toth et al. .................. 364/14 |
| 5,488,501 A | 1/1996 | Barnsley .................... 359/137 |
| 5,537,243 A | 7/1996 | Fatehi et al. .............. 359/541 |
| 5,617,232 A | 4/1997 | Takemori .................. 359/108 |
| 5,623,366 A | 4/1997 | Hait ........................... 359/577 |
| 5,655,039 A | 8/1997 | Evans .......................... 385/27 |
| 5,739,933 A | 4/1998 | Dembeck et al. .......... 359/117 |
| 5,831,731 A | 11/1998 | Hall et al. ................. 356/345 |
| 5,870,513 A * | 2/1999 | Williams .................... 359/113 |
| 5,892,965 A * | 4/1999 | Miura et al. ................ 712/1 |

(List continued on next page.)

OTHER PUBLICATIONS

"Wave proagation in nonlinear photonic band–gap materials" Li, et al., Physical Review B: Condensed Matter vol. 53, No. 23, 15577–15585 (Jun. 15, 1996).

(List continued on next page.)

*Primary Examiner*—Brian Healy
*Assistant Examiner*—Daniel Petkovsek

(57) ABSTRACT

Analog noise is subtracted from an optical communication channel using stable, non-absorbing optical hard limiters. A reference signal B is combined with a control signal of intensity I2 through a 3 dB optical coupler to form a first combined signal having an intensity substantially equal to (B/2+I1). The first combined signal is processed by a first optical hard limiter to form a reflected signal having an intensity substantially equal to (I1−B/2). An information signal A is combined with a bias signal of intensity I2 through a 3 dB optical coupler to form a second combined signal. The reflected signal and the second combined signal are combined through a 3 dB optical coupler to form a third combined signal having an intensity substantially equal to 0.5(I1−B/2+A/2+I1). The third combined signal is processed by a second optical hard limiter to form a transmitted signal having an intensity substantially equal to 0.5(A−B). I2 is substantially equal to two times I1.

6 Claims, 6 Drawing Sheets

U.S. PATENT DOCUMENTS

| | | | |
|---|---|---|---|
| 5,999,283 A | 12/1999 | Roberts et al. | 359/108 |
| 5,999,284 A | 12/1999 | Roberts | 359/108 |
| 6,005,791 A | 12/1999 | Gudesen et al. | 365/114 |
| 6,041,126 A | 3/2000 | Terai et al. | 381/71.6 |
| 6,044,341 A | 3/2000 | Takahashi | 704/226 |
| 6,266,173 B1 * | 7/2001 | Hayes | 359/119 |
| 6,415,075 B1 * | 7/2002 | DeRosa et al. | 385/27 |

OTHER PUBLICATIONS

"The Interaction of Electromagnetic Radiation with Magnetic Media" http://www.qub.ac.uk/mp/con/magnetics_group/magnetoptics.html.

"Three–Dimensional Arrays in Polymer Nanocomposites" Kumacheva, et al., Advanced Material, 1999, 11, No. 3.

"Intergrable, Low–Cost, All–Optical WDM Signal Processing: Narrowband Hard Limiters and Analog–to–Digital Converters" Sargent, et al., Jan. 2000.

"Nonlinear Distributed Feedback Structures for Optical Sensor Protection" Brzozowski, et al., Apr. 2000.

"Optical Signal Processing Using Nonlinear Distributed Feedback Structures" Brzozowski, et al., IEEE Journal of Quantum Electronics, vol. 36, No. 5, May 2000.

"All–Optical Analog–to–Digital Converter for Photonic Networks Using Multilevel Signaling" Brzozowski, et al., Jun., 2000.

"Photonic Crystals for Intergrated Optical Computing" Brzozowski, et al. Jun. 2000.

"Nonlinear distributed–feedback structures as passive optical limiters" Brzozowski, et al., J. Opt. Soc. Am B, vol. 17, No. 8, Aug. 2000.

"Stability of Periodic Nonlinear Optical Structures for Limiting and Logic", Brzozowski, et al. Sep. 2000.

"Transmission Regimes of Periodic Nonlinear Optical Structures" Pelinovsky, Dmitry, Rapid Communications, Physical Review E, vol. 62, No. 4, Oct. 2000.

"Nonlinear Disordered Media for Broad–Band Optical Limiting" Brzozowski, et al., IEEE Journal of Quantum Electronics, vol. 36, No. 11, Nov. 2000.

"Realization of All–Optical Ultrafast Logic Gates Using Triple Core Asymmetric Nonlinear Directional Coupler", Natasa Trivunac–Vukovic,Journal of Optical Communications, 2001.

"All–Optical Analog–to Digital Converters, Hardlimiters, and Logic Gates", Brzozowski, et al., Journal of Lightwave Technology, vol. 19, No. 1, Jan. 2001.

"Stable All–Optical Limiting in Nonlinear Periodic Structures", Pelinovsky, et al., Feb. 8, 2001.

"All–Optical Signal Processing and Packet Forwarding Using Nonmonotonic Intensity Transfer Characteristics", Johnson, E.V., A thesis submitted in conformity with the requirements for the degree of Master of Applied Science Graduate Department of electrical and Computer Engineering University of Toronto, 2001.

* cited by examiner

|  | 0 < INPUT < I1 | I1 < INPUT < I2 | I2 < INPUT |
|---|---|---|---|
| ITRANSMITTED | 0 | 2*INPUT - I2 | I2 |
| IREFLECTED | INPUT | I2 - INPUT | INPUT - I2 |

FIG. 4  400 ically equal to two times I1.

SUBTRACTING ANALOG NOISE FROM AN OPTICAL COMMUNICATION CHANNEL USING STABLE, NON-ABSORBING OPTICAL HARD LIMITERS

PRIORITY

The present application claims priority from U.S. Provisional Patent Application No. 60/267,879, which was filed on Feb. 9, 2001, and is hereby incorporated herein by reference in its entirety.

CROSS-REFERENCE TO RELATED APPLICATION(S)

The present application may be related to the following commonly owned United States patent applications, which are hereby incorporated herein by reference in their entireties:

U.S. patent application Ser. No. 09/846,886, entitled OPTICAL LIMITER BASED ON NONLINEAR REFRACTION, pending, filed on May 1, 2001 in the names of Edward H. Sargent and Lukasz Brzozowski; and U.S. patent application Ser. No. 09/933,315, entitled OPTICAL LOGIC DEVICES BASED ON STABLE, NON-ABSORBING OPTICAL HARD LIMITERS, pending, filed on even date herewith in the names of Erik V. Johnson and Edward H. Sargent.

FIELD OF THE INVENTION

The present invention relates generally to optical information processing, and more particularly to subtracting analog noise from an optical communication channel using stable, non-absorbing optical hard limiters.

BACKGROUND OF THE INVENTION

In today's information age, optical communication technologies are being used more and more frequently for transmitting information at very high speeds. As with other types of communication technologies, the accumulation of noise along an optical communication channel degrades the signal-to-noise ratio and thus increases the bit error.

Generally speaking, noise can be removed by filtering out-of-band noise, which would not work when the noise is in the same band as the information, or by filtering in-band noise (U.S. Pat. Nos. 6,044,341, 6,041,126 for voice).

SUMMARY OF THE INVENTION

In accordance with one aspect of the invention, analog noise is subtracted from an optical communication channel using stable, non-absorbing optical hard limiters.

In accordance with another aspect of the invention, an optical noise subtractor includes a first optical coupler operably coupled to receive a reference signal B and a control signal of intensity I2 and to output a first combined signal therefrom, a first optical hard limiter operably coupled to receive the first combined signal from the first optical coupler and to output a reflected signal therefrom, a second optical coupler operably coupled to receive an information signal A and a bias signal of intensity I2 and to output a second combined signal therefrom, a third optical coupler operably coupled to receive the reflected signal from the first optical hard limiter and the second combined signal from the second optical coupler and to output a third combined signal therefrom, and a second optical hard limiter operably coupled to receive the third combined signal from the third optical coupler and to output a transmitted signal therefrom. The first combined signal output from the first optical coupler is substantially equal to (B/2+I1). The reflected signal output by the first optical hard limiter is substantially equal to (I1−B/2). The second combined signal output by the second optical coupler is substantially equal to (A/2+I1). The third combined signal output by the third optical coupler is substantially equal to 0.5(I1−B/2+A/2+I1). The transmitted signal output by the second optical hard limiter is substantially equal to 0.5(A−B). I2 is substantially equal to two times I1.

In accordance with yet another aspect of the invention, a method for subtracting analog noise from an optical communication channel using stable, non-absorbing optical hard limiters involves combining a reference signal B with a control signal of intensity I2 through a 3 dB optical coupler to form a first combined signal having an intensity substantially equal to (B/2+I1), processing the first combined signal by an optical hard limiter to form a reflected signal having an intensity substantially equal to (I1−B/2), combining an information signal A with a bias signal of intensity I2 through a 3 dB optical coupler to form a second combined signal, combining the reflected signal and the second combined signal through a 3 dB optical coupler to form a third combined signal having an intensity substantially equal to 0.5(I1−B/2+A/2+I1), and processing the third combined signal by an optical hard limiter to form a transmitted signal having an intensity substantially equal to 0.5(A−B). I2 is substantially equal to two times I1.

In accordance with still another aspect of the invention, a method for subtracting analog noise from an optical communication channel using stable, non-absorbing optical hard limiters involves compressing a reference signal B in the range {0, I2} into a compressed reference signal in the range {I1, I2}, inverting the compressed reference signal to form an inverted compressed reference signal, compressing an information signal A in the range {0, I2} into a compressed information signal in the range {I1, I2}, combining the inverted compressed reference signal and the compressed information signal to form a combined signal essentially subtracting the compressed reference signal from the compressed information signal, and expanding the combined signal in the range {I1, I2} into a transmitted signal in the range {0, I2}, wherein I2 is substantially equal to two times I1.

BRIEF DESCRIPTION OF THE DRAWINGS

In the accompanying drawings:

FIG. 4 is a block diagram showing the relationship between the input signal, transmitted signal, and reflected signal of an exemplary optical hard limiter in accordance with an embodiment of the present invention;

DETAILED DESCRIPTION OF A PREFERRED EMBODIMENT

In an embodiment of the present invention, analog noise is subtracted from an optical communication channel using stable, non-absorbing optical hard limiters. Subtracting this extra signal at an extremely fast rate significantly improves the quality of the signal. The technique of the present invention is similar to re-shaping the signal, but is still effective even at extremely high noise levels.

Exemplary stable, non-absorbing optical hard limiters are described in the related applications entitled OPTICAL LIMITER BASED ON NONLINEAR REFRACTION and OPTICAL LOGIC DEVICES BASED ON STABLE, NON-ABSORBING OPTICAL HARD LIMITERS, which were incorporated by reference above. Typically, these stable non-absorbing optical hard limiters consist of alternating layers of materials with different linear indices and oppositely signed Kerr coefficients. This construction maintains the center of the stopband in generally the same spectral location, thereby providing stability. The linear and non-linear indices of the layers are such that the material with the lower linear index has a positive Kerr coefficient and the material with the higher linear index has a negative Kerr coefficient. Devices with these properties typically exhibit three regimes of operation, specifically a first regime bounded by input intensities from 0 to I1 in which the signal is completely reflected, a second regime bounded by input intensities from I1 to I2 in which the transmitted signal increases and the reflected signal decreases as intensity increases, and a third regime above input intensity I2 in which all light above a certain level is reflected. The existence of these three regimes enables these devices to be used in optical logic applications. As the nonideality of the device increases, the curve is smoothed. For these devices, I2 is defined as the input intensity at which the built-in optical grating has disappeared completely, and I1 is defined as half of I2. In various embodiments of the present invention, intensity I2 represents a logic one (high), and intensity zero represents a logic zero (low).

Figure 1:
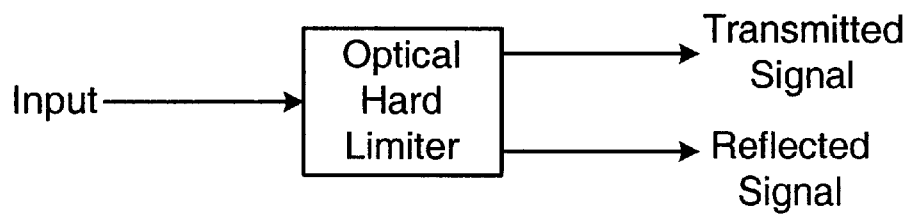
FIG. 1 is a schematic block diagram showing the input, transmitted output, and reflected output of an exemplary optical hard limiter in accordance with an embodiment of the present invention.

FIG. 1 shows a "black box" view of an exemplary optical hard limiter 100. The optical hard limiter 100 outputs a transmitted signal and a reflected signal based upon the intensity of an input signal.

Figure 2A:
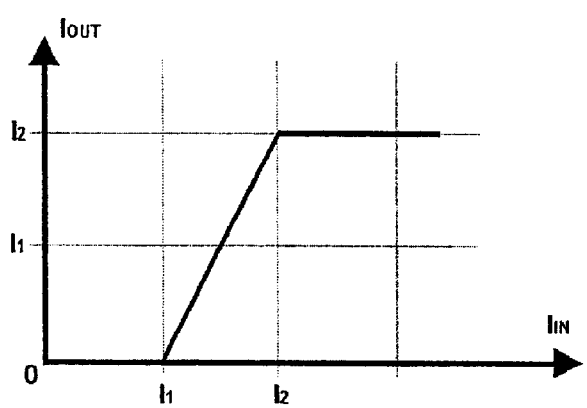
FIG. 2A is a graph showing the idealized transmitted transfer function of an optical hard limiter in accordance with an embodiment of the present invention.

FIG. 2A shows the idealized transmitted transfer characteristics 200 of the optical hard limiter 100. As shown, the transmitted signal is zero for input signals from zero to I1. The transmitted signal increases from zero to I2 as the input signal increases from I1 to I2. The transmitted signal is limited to I2 for input signals above I2.

Figure 2B:
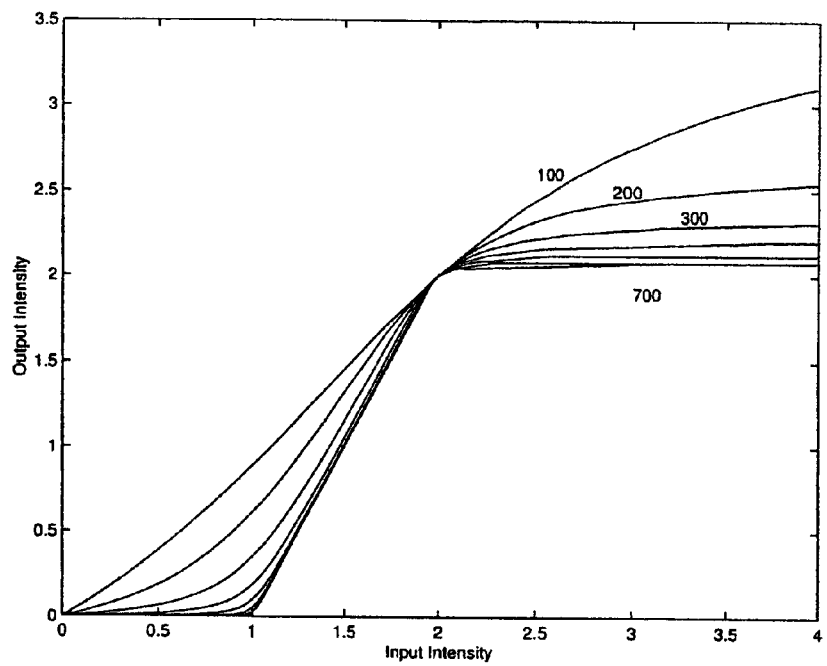
FIG. 2B is a graph showing the simulated transmitted transfer functions for finite optical hard limiters with different numbers of layers in accordance with an embodiment of the present invention.

In actuality, the transmitted transfer characteristics of the optical hard limiter 100 generally differ from the idealized transmitter transfer characterstics 200 shown in FIG. 2A, and depend upon the number of layers in the optical hard limiter 100. FIG. 2B shows simulated transmitted transfer characteristics 210 for finite devices having different numbers of layers. Devices with more layers approach the piecewise linear behavior of the idealized transmitted transfer characteristics 200 shown in FIG. 2A.

Figure 3:
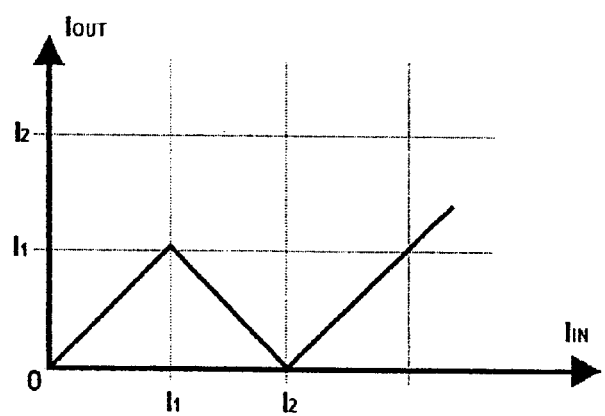
FIG. 3 is a graph showing the idealized reflected transfer function of an optical hard limiter in accordance with an embodiment of the present invention.

FIG. 3 shows the idealized reflected transfer characteristics 300 of the optical hard limiter 100. As shown, the reflected signal increases from zero to I1 as the input signal increases from zero to I1. The reflected signal decreases from I1 to zero as the input signal increases from I1 to I2. The reflected signal increases as the input signal increases above I2.

As with the transmitted transfer characteristics, the actual reflected transfer characteristics of the optical hard limiter 100 generally differ from the idealized reflected transfer characterstics 300 shown in FIG. 3, and depend upon the number of layers in the optical hard limiter 100. Simulated reflected transfer characteristics for finite devices having different numbers of layers are omitted for convenience.

FIG. 4 is a table summarizing the relationship between the input signal INPUT, the transmitted signal ITRANSMITTED, and the reflected signal IREFLECTED of a stable, non-absorbing optical hard limiter. The transmitted signal is equal to zero for input intensities between zero and I1, two times the input signal minus I2 (i.e., 2*INPUT-I2) for input intensities between I1 and I2, and I2 for input intensities above I2. The reflected signal is equal to the input signal INPUT for input intensities between zero and I1, I2 minus the input signal (i.e., I2-INPUT) for input intensities between I1 and I2, and the input signal minus I2 (i.e., INPUT-I2) for input intensities above I2.

An exemplary optical noise subtractor operates as follows.

A reference signal B is combined with a control signal of intensity I2 through a 3 dB optical coupler, yielding a signal of intensity (B/2+I1). This signal is fed to a first optical hard limiter. Because the intensity of the signal (B/2+I1) falls substantially within the middle intensity region, the reflected signal is as follows:

$$IREFLECTED = I2 - INPUT$$
$$= I2 - (B/2 + I1)$$
$$= I1 - B/2$$

The information signal A is combined with a bias signal of intensity I2 through a 3 dB optical coupler, yielding a signal of intensity (A/2+I1). This signal is combined with the reflected signal from the first optical hard limiter through a 3 dB optical coupler, yielding a signal of intensity 0.5*(I1-B/2+A/2+I1). This signal is fed into a second optical hard limiter. Because the intensity of the signal 0.5*(I1-B/2+A/2+I1) falls substantially within the middle intensity region, the transmitted signal is as follows:

$$ITRANSMITTED = 2 * INPUT - I2$$
$$= 2(0.25(A - B) + 0.5(I1 + I1)) - I2$$
$$= 0.5(A - B) + 2 * I1 - 2 * I1$$
$$= 0.5(A - B)$$

Thus, the optical noise subtractor effectively subtracts the analog noise from the optical communication channel at the speed of the response of the various devices, with the trade-off of decreasing the intensity of the information signal by 3 dB.

Figure 5:
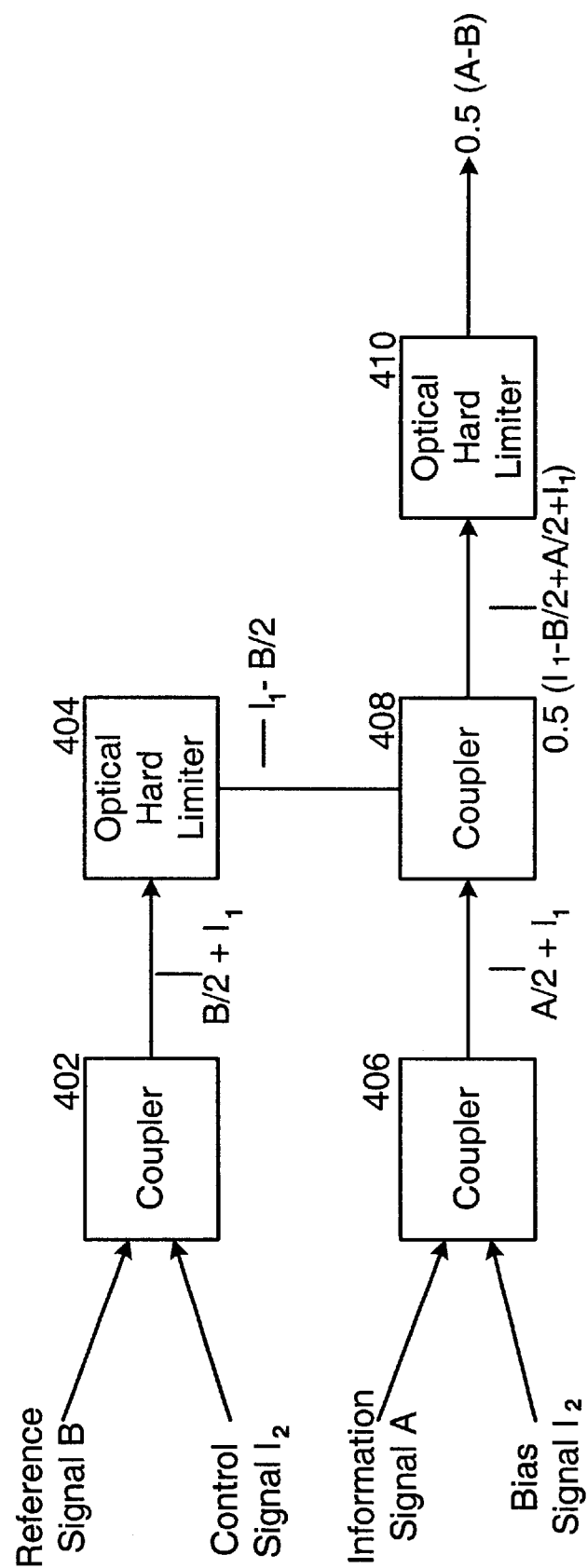
FIG. 5 is a schematic block diagram showing an exemplary optical noise subtractor in accordance with an embodiment of the present invention.

FIG. 5 is a schematic block diagram showing an exemplary optical noise subtractor. Among other things, the optical noise subtractor includes optical couplers 402, 406, 408 and optical hard limiters 404, 410.

The optical coupler 402 receives the reference signal B and the control signal of intensity I2. The optical coupler 402 combines these signals and outputs a signal of intensity (B/2+I1).

The optical hard limiter 404 receives the signal of intensity (B/2+I1) from the optical coupler 402. The optical hard limiter 404 outputs a reflected signal of intensity (I1−B/2).

The optical coupler 406 receives the information signal A and the bias signal of intensity I2. The optical coupler 406 combines these signals and outputs a signal of intensity (A/2+I1).

The optical coupler 408 receives the reflected signal of intensity (I1−B/2) from the optical hard limiter 404 as well as the signal of intensity of (A/2+I1) from the optical coupler 406. The optical coupler 408 combines theses signals and outputs a signal of intensity 0.5(I1−B/2+A/2+I1).

The optical hard limiter 410 receives the signal of intensity 0.5(I1−B/2+A/2+I1) from the optical coupler 408. The optical hard limiter 410 outputs a transmitted signal of intensity 0.5(A−B), thus effectively subtracting the noise from the information signal.

In essence, then, the optical coupler 402 compresses the reference signal B in the range {0, I2} into a compressed reference signal in the range {I1, I2}, and the optical hard limiter 404 inverts the compressed reference signal to form an inverted compressed reference signal. Similarly, the optical coupler 406 compresses the information signal A in the range {0, I1} into a compressed information signal in the range {I1, I2}. The optical coupler 408 combines the inverted compressed reference signal and the compressed information signal to form a combined signal essentially subtracting the compressed reference signal from the compressed information signal. The optical hard limiter 410 expands the combined signal in the range {I1, I2} into a transmitted signal in the range {0, I2}.

Figure 6:
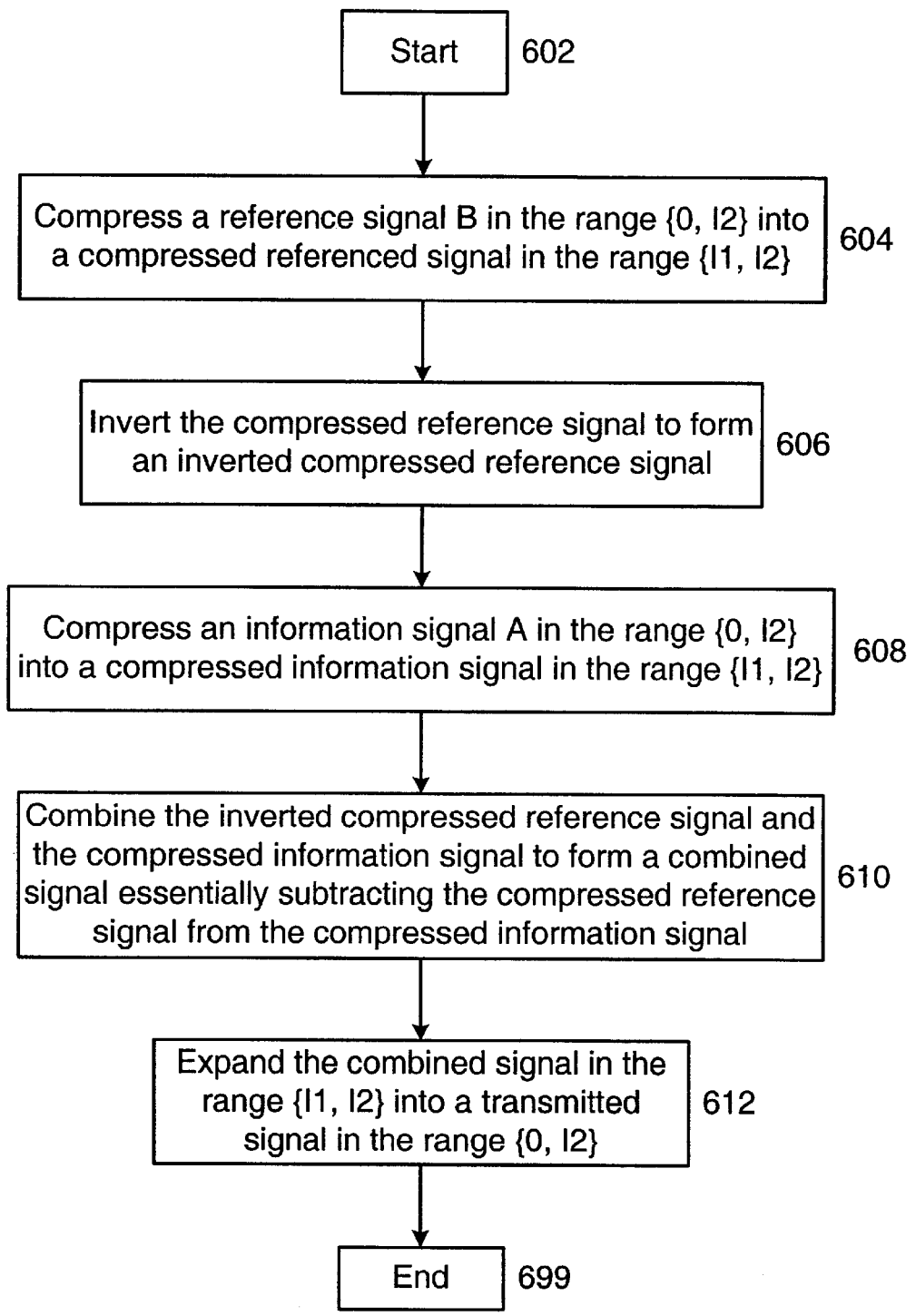
FIG. 6 is a logic flow diagram showing exemplary logic for subtracting analog noise from an optical communication channel using stable, non-absorbing optical hard limiters in accordance with an embodiment of the present invention.

FIG. 6 is a logic flow diagram showing exemplary logic 600 for subtracting an analog signal from an optical communication channel using stable, non-absorbing optical hard limiters. Beginning at block 602, the logic compresses a reference signal B in the range {0, I2} into a compressed reference signal in the range {I1, I2}, in block 604. The logic inverts the compressed reference signal to form an inverted compressed reference signal, in block 606. The logic compresses an information signal A in the range {0, I2} into a compressed information signal in the range {I1, I2}, in block 608. The logic combines the inverted compressed reference signal and the compressed information signal to form a combined signal essentially subtracting the compressed reference signal from the compressed information signal, in block 610. The logic expands the combined signal in the range {I1, I2} into a transmitted signal in the range {0, I2}, in block 612. The logic 600 terminates in block 699.

Additional considerations are discussed in E.V. Johnson, ALL-OPTICAL SIGNAL PROCESSING AND PACKET FORWARDING USING NONMONOTONIC INTENSITY TRANSFER CHARACTERISTICS, a thesis submitted in conformity with the requirements for the degree of Master of Applied Science, Graduate Department of Electrical and Computer Engineering, University of Toronto (2001), which is hereby incorporated herein by reference in its entirety.

The present invention may be embodied in other specific forms without departing from the true scope of the invention. The described embodiments are to be considered in all respects only as illustrative and not restrictive.

What is claimed is:

1. An optical noise subtractor comprising:

a first optical coupler operably coupled to receive a reference signal B and a control signal of intensity I2 and to output a first combined signal therefrom;

a first optical hard limiter operably coupled to receive the first combined signal from the first optical coupler and to output a reflected signal therefrom;

a second optical coupler operably coupled to receive an information signal A and a bias signal of intensity I2 and to output a second combined signal therefrom;

a third optical coupler operably coupled to receive the reflected signal from the first optical hard limiter and the second combined signal from the second optical coupler and to output a third combined signal therefrom; and a second optical hard limiter operably coupled to receive the third combined signal from the third optical coupler and to output a transmitted signal therefrom.

2. The optical noise subtractor of claim 1, wherein:

the first combined signal output from the first optical coupler is substantially equal to (B/2+I1);

the reflected signal output by the first optical hard limiter is substantially equal to (I1−B/2);

the second combined signal output by the second optical coupler is substantially equal to (A/2+I1);

the third combined signal output by the third optical coupler is substantially equal to 0.5(I1−B/2+A/2+I1); and the transmitted signal output by the second optical hard limiter is substantially equal to 0.5(A−B), wherein I2 is substantially equal to two times I1.

3. The optical noise subtractor of claim 1, wherein the optical couplers are 3 dB optical couplers.

4. The optical noise subtractor of claim 1, wherein the optical hard limiters comprise:

a first operating region bounded by input intensities from 0 to I1 in which the signal is completely reflected;

a second operating region bounded by input intensities from I1 to I2 in which the transmitted signal increases and the reflected signal decreases as intensity increases; and a third operating region above input intensity I2 in which all light above a certain level is reflected, wherein I2 is substantially equal to two times I1.

5. A method for subtracting analog noise from an optical communication channel using stable, non-absorbing optical hard limiters, the method comprising:

combining a reference signal B with a control signal of intensity I2 through a 3 dB optical coupler to form a first combined signal having an intensity substantially equal to (B/2+I1);

processing the first combined signal by an optical hard limiter to form a reflected signal having an intensity substantially equal to (I1−B/2);

combining an information signal A with a bias signal of intensity I2 through a 3 dB optical coupler to form a second combined signal;

combining the reflected signal and the second combined signal through a 3 dB optical coupler to form a third combined signal having an intensity substantially equal to 0.5(I1−B/2+A/2+I1); and processing the third combined signal by an optical hard limiter to form a transmitted signal having an intensity substantially equal to 0.5(A−B), wherein I2 is substantially equal to two times I1.

6. A method for subtracting analog noise from an optical communication channel using stable, non-absorbing optical hard limiters, the method comprising:

compressing a reference signal B in the range {0, I2} into a compressed reference signal in the range {I1, I2};

inverting the compressed reference signal to form an inverted compressed reference signal;

compressing an information signal A in the range {0, I2} into a compressed information signal in the range {I1, I2};

combining the inverted compressed reference signal and the compressed information signal to form a combined signal essentially subtracting the compressed reference signal from the compressed information signal; and expanding the combined signal in the range {I1, I2} into a transmitted signal in the range {0, I2}, wherein I2 is substantially equal to two times I1.

* * * * *